US010299304B1

(12) United States Patent
Hintermeister et al.

(10) Patent No.: US 10,299,304 B1
(45) Date of Patent: May 21, 2019

(54) SECURELY COMMUNICATING A STATUS OF A WIRELESS TECHNOLOGY DEVICE TO A NON-PAIRED DEVICE

(71) Applicant: International Business Machines Corporation, Armonk, NY (US)

(72) Inventors: Gregory R. Hintermeister, Rochester, MN (US); Matthew G. Kelm, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/813,637

(22) Filed: Nov. 15, 2017

(51) Int. Cl.
| H04M 1/66 | (2006.01) |
| H04W 76/14 | (2018.01) |
| H04W 12/06 | (2009.01) |
| H04W 12/08 | (2009.01) |
| H04L 29/06 | (2006.01) |
| H04W 76/32 | (2018.01) |
| H04W 4/02 | (2018.01) |
| H04W 4/80 | (2018.01) |

(52) U.S. Cl.
CPC ......... *H04W 76/14* (2018.02); *H04L 63/0428* (2013.01); *H04W 12/06* (2013.01); *H04W 12/08* (2013.01); *H04W 76/32* (2018.02); *H04W 4/025* (2013.01); *H04W 4/80* (2018.02)

(58) Field of Classification Search
CPC .... H04L 63/0428; H04W 76/14; H04W 76/32
USPC ........................................................ 455/411
See application file for complete search history.

(56) References Cited

U.S. PATENT DOCUMENTS

| 9,297,882 | B1 | 3/2016 | Bhatia | |
| 9,485,613 | B2 | 11/2016 | Pan et al. | |
| 10,108,272 | B1* | 10/2018 | DeBates | ................. G06F 3/017 |
| 2015/0156647 | A1* | 6/2015 | Braun | ................... H04W 24/08 455/426.1 |
| 2016/0203315 | A1* | 7/2016 | Wentz | ..................... G06F 21/53 726/4 |
| 2016/0241541 | A1* | 8/2016 | Soelberg | ................. H04W 4/70 |
| 2016/0335876 | A1 | 11/2016 | Verma | |
| 2017/0064511 | A1 | 3/2017 | McCormick | |
| 2018/0096549 | A1* | 4/2018 | Tseng | .................. E05B 47/0012 |

\* cited by examiner

*Primary Examiner* — Charles T Shedrick
(74) *Attorney, Agent, or Firm* — Schmeiser, Olsen & Watts, LLP; Maeve Carpenter

(57) ABSTRACT

A wireless technology device and method for securely communicating a status of a wireless technology device to a non-paired device, includes detecting a status changing event of the wireless technology device, locking the wireless technology device from an unauthorized pairing with another device, in response to detecting the status changing event, sending an encrypted data regarding the status changing event to at least one non-paired device, which is received in a buffer of the at least one non-paired device, wherein, in response to receiving the encrypted data, the at least one non-paired device automatically communicates the encrypted data to a centralized computing network for decrypting the encrypted data, and unlocking the wireless technology device when an authorized pairing attempt is successful.

20 Claims, 10 Drawing Sheets

SECURELY COMMUNICATING A STATUS OF A WIRELESS TECHNOLOGY DEVICE TO A NON-PAIRED DEVICE

TECHNICAL FIELD

The present invention relates to systems and methods for securely communicating a status of a wireless technology device, and more specifically to embodiments of a secure status communication system for securely communicating a status of a wireless technology device to nearby devices for securely locating the wireless technology device.

BACKGROUND

Wireless technology devices are increasingly becoming smaller, and thus becoming easier to lose or misplace.

SUMMARY

An embodiment of the present invention relates to a method, an associated wireless technology device, and computer program product, for securely communicating a status of a wireless technology device to a non-paired device. A processor of a computing system detects a status changing event of the wireless technology device. The wireless technology device is locked from an unauthorized pairing with another device, in response to detecting the status changing event. An encrypted data regarding the status changing event is sent to at least one non-paired device, which is received in a buffer of the at least one non-paired device, wherein, in response to receiving the encrypted data, the at least one non-paired device automatically communicates the encrypted data to a centralized computing network for decrypting the encrypted data. The wireless technology device is unlocked when an authorized pairing attempt is successful.

DETAILED DESCRIPTION

If a user loses a wireless technology device, such as a Bluetooth® headset, the user can trigger the headset through a software application to make an audible sound if connected to the application, and/or the application may pinpoint a location on a virtual map to visualize the location when the headset was last used. Further, wireless technology devices, such as smartphones, have the ability to lock or otherwise prevent unauthorized access if the user decides to lock the smartphone until the smartphone is found. However, these methods are user initiated and only cover a fraction of possible situations, and the user may take some time before the user realized that the wireless technology device is lost. As time passes while the wireless technology device is lost or otherwise misplaced, the battery of the device could be drained, among other adverse outcomes.

In many cases, the wireless technology device is not the sole wireless technology device located in an environment. If the wireless technology device becomes lost, embodiments of the present invention may use the plurality of wireless technology devices (e.g. clients) available in an environment to keep track of the wireless technology device and shorten a window of time between a moment the wireless technology device becomes lost and the user is made aware of the change in status (e.g. from secure or not lost to lost or misplaced). Embodiments of the present invention may include a system where a Bluetooth device or other wireless technology device can determine when the wireless technology device is getting lost, lock itself from non-authorized pairing, securely communicate to a lifeline buffer located in nearby Bluetooth clients, regardless of whether the device has ever been paired with the nearby clients, have each client anonymously notify a centralized cloud where a current location of the client is injected into the notification content, and have the cloud notify the device owner immediately and securely so the user can find the wireless technology device and unlock the wireless technology device during pairing. As a result, a window between getting lost and being found may be shortened, the user may be immediately notified by using any nearby client, rather than only a paired client, to communicate to a centralized cloud location, and locking and communicating unique code to unlock from lost device.

Figure 1:
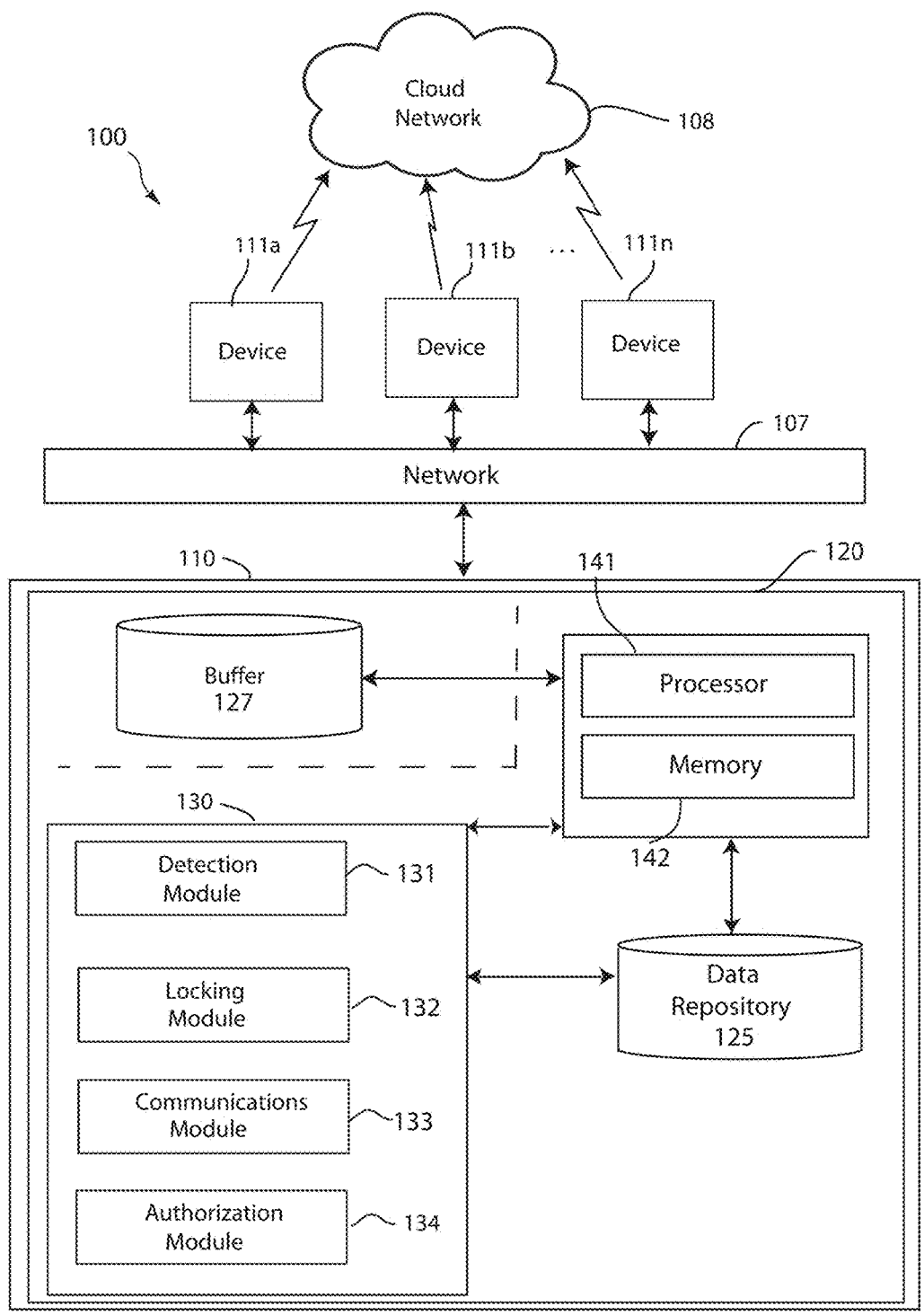
FIG. 1 depicts a block diagram of a secure status communication system, in accordance with embodiments of the present invention.

Referring to the drawings, FIG. 1 depicts a block diagram of a secure status communication system 100, in accordance with embodiments of the present invention. Embodiments of the secure status communication system 100 may be a system for securely communicating a status of a wireless technology device 110, which can be used to locate the wireless technology device 110 in a time efficient and secure manner. Embodiments of the secure status communication system 100 may be useful for reducing a time between a wireless technology device 110 is lost and found, as well as securing the wireless technology device 110 during a lost status of the wireless technology device 110, using nearby wireless technology devices 111*a*, 111*b* . . . 111*n* (herein referred to as "devices 111"). In an exemplary embodiment, the other wireless technology devices 111 may be located in a same environment as the wireless technology device 110. Embodiments of the environment may be a venue, a location, house, a classroom, a school, a room, a warehouse, a building, a city, a neighborhood, a district, a shopping center, a warehouse, a campus, a hospital, a base camp, a shopping mall, a retail store, a market, an airport, a train station, a stadium, and the like. Embodiments of the secure status communication system 100 may be a wireless device secure processing system, a wireless technology management system, a retrieval system for wireless technology devices, a status communication and retrieval system, a lifeline system for wireless technology devices, and the like.

Embodiments of the secure status communication system 100 may include a wireless technology device 110, which may have a computing system 120. Embodiments of the wireless technology device 110 may be a wireless device, a Bluetooth device, a near-field communication device, a device used for short range communication, a network connectable device, and the like. Further, embodiments of the wireless technology device 110 may be a computing device, a computer, a cellular phone, a user mobile device, a user computing device, a tablet computer, a speaker, an intelligent personal assistant device, a smart watch, a wearable computing device, a smart thermostat, audio equipment, a television, such as smart eyeglasses, a dedicated mobile device, a laptop computer, a headset, a pair of headphones, other internet accessible device or hardware and the like, which utilize short range communication network technology, as well as other network technology. Embodiments of the wireless technology device 110 may include hardware functionality such as a speaker for emitting a sound, a vibration motor for creating vibrations, a display for displaying notifications, a light emitting element for emitting a light, a receiver for receiving communications, a transmitter for transmitting signals, and other similar features and hardware of a wireless technology device 110.

Embodiments of the computing system 120 of the wireless technology device 110 may include a buffer 127. Embodiments of buffer 127 may be referred to as a lifeline buffer, a buffer, a communications buffer, and the like. Embodiments of the buffer 127 may store encrypted data, such as encrypted lifeline data, associated with the wireless technology device 110. For example, the buffer 127 may contain a unique code or unique key for unlocking the wireless technology device 110 when the wireless technology device 110 locks, as described in greater detail infra. Moreover, embodiments of the buffer 127 may be equipped to receive and store or temporarily store encrypted data sent by other devices 111, which may then be anonymously communicated to a central cloud location 108, as described in greater detail infra. Embodiments of the buffer 127 may be inaccessible by an operating system of the computing system 120 so that the wireless technology device 110, if receiving encrypted data from another device 111, cannot access the unique code or key, as well as other lifeline data of the device 111. The buffer 127 may be a part of a memory of the computing system 120 or may be a separate memory location of the computing system 120, coupled to the processor 141 for sending the encrypted lifeline data to other device's buffers, and/or sending received lifeline data to a central cloud location 108. Embodiments of the buffer 127 may store information from never-paired or formerly paired devices, such as a unique unlock code for another device. Further, embodiments of the buffer 127 may be extended to monitor for RFID tags and communicate to the central cloud location 108, for enabling a lost device that runs out of battery to still have potential to be found with no user interaction.

Furthermore, embodiments of secure status communication system 100 may include one or more devices 111. Embodiments of the devices 111 may be a similar or same device as the wireless technology device 110 described above. For instance, embodiments of the devices 111 may be a computing device, a computer, a cellular phone, a user mobile device, a user computing device, a tablet computer, a speaker, an intelligent personal assistant device, a smart watch, a wearable computing device, a smart thermostat, audio equipment, a television, such as smart eyeglasses, a dedicated mobile device, a laptop computer, a headset, a pair of headphones, other internet accessible device or hardware and the like, which utilize short range communication network technology, as well as other network technology. Embodiments of the devices 111 may be connectable to the wireless technology device 110 over a network 107. For instance, information/data may be transmitted to and/or received from the wireless technology device 110 over network 107. A network 107 may be a short range wireless communication network, wherein devices 111 may connect or pair with each other, and/or to wireless technology device 110. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

Embodiments of the devices 111 may each include a buffer, similar to buffer 127 described with respect to the wireless technology device 110. Embodiments of the buffer of the devices 111 may be referred to as a lifeline buffer, a buffer, a communications buffer, and the like. Embodiments of the buffer of the devices 111 may store encrypted data, such as encrypted lifeline data, associated with the device 111. For example, the buffer of the device 111 may contain a unique code or unique key for unlocking the device 111 when the device 111 locks, as described in greater detail infra. Moreover, embodiments of the buffer of the device 111 may be equipped to receive and store or temporarily store encrypted data sent by other devices 111 (e.g. if a device determines the device is getting lost), which may then be anonymously communicated to a central cloud location 108, as described in greater detail infra. Embodiments of the buffer of the device 111 may be inaccessible by an operating system of a computing system of the device 111 so that the device 111, if receiving encrypted data from another device 111 or the wireless technology device 110, cannot access the unique code or key, as well as other lifeline data. The buffer of the device 111 may be a part of a memory of the computing system of the device 111 or may be a separate memory location of the computing system, coupled to a processor for sending the encrypted lifeline data to other device's buffers, and/or sending received lifeline data to a central cloud location 108. Embodiments of the buffer of the device 111 may store information from never-paired or formerly paired devices, such as a unique unlock code for the wireless technology device 110, sent by the wireless technology device 110. Further, embodiments of the buffer of the device 111 may be extended to monitor for RFID tags and communicate to the central cloud location 108, for enabling a lost device that runs out of battery to still have potential to be found with no user interaction.

Furthermore, embodiments of the computing system 120 of the wireless technology device 110 may be equipped with a memory device 142 which may store various data/information/code, and a processor 141 for implementing the tasks associated with the secure status communication system 100. In some embodiments, a lifeline application 130 may be loaded in the memory device 142 of the computing system 120 of the wireless technology device 110. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the lifeline application 130. Embodiments of the lifeline application 130 may be an interface, an application, a program, a module, or a combination of modules. In an exemplary embodiment, the lifeline application 130 may be a software application running on the wireless technology device 110; a lifeline application may also be running on each of the devices 111.

The lifeline application 130 of the computing system 120 may include a detection module 131, a locking module 132, a communications module 133, and an authorization module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the detection module 131 may include one or more components of hardware and/or software program code for detecting a status changing event of the wireless technology device. A status of the wireless technology device 110 may be a safe status, a secure status, a known location status, a non-lost status, and the like, wherein the wireless technology device 110 is not lost, about to get lost, getting lost, and the like. Another status of the wireless technology device 110 may be a lost status, a non-secure status, an insecure status, an unknown location status, an about to get lost status, a getting lost status, and the like, wherein the wireless technology device 110 is not safe, secure, location known, and the like. Embodiments of the detection module 131 may detect a change in status of the wireless technology device 110. For example, the detection module 131 may detect a status changing event by determining that the wireless technology device 111 is lost, about to get lost, or is getting lost.

Embodiments of the detection module 131 may determine that a status changing event is occurring with respect to wireless technology device 110 by detecting, determining, analyzing, etc. a plurality of factors surrounding the wireless technology device 110, companion clients, environmental conditions, other devices 111, user activity, power consumption or charging activity, sensor (e.g. accelerometer) data, and other useful information/data/activity. Embodiments of the detection module 131 may determine that the wireless technology device 110 is lost by detecting, determining, analyzing, etc. whether a proximity range between the device 110 and a companion device, such as one device 111 of a plurality of devices 111 is exceeded. For example, if the detection module 131 detects that the wireless technology device (e.g. earbuds) exceeds 3 feet from a companion device (e.g. music playing device), then the detection module 131 may determine that the wireless technology device 110 is lost or about to get lost because these devices are typically always kept in close proximity with each other. The proximity may be a predetermined distance or range, for example, 1 foot, 2 feet, 3 feet, 10 feet, etc. In another exemplary embodiment, the detection module 131 may determine that the wireless technology device 110 is lost or getting lost by detecting, determining, analyzing, etc. data from a sensor, such as an accelerometer, of the wireless technology device 110, which suggests that the wireless technology device 111 is falling. The detection module 131 may continue to analyze the location of the wireless technology device 110 or a movement of the wireless technology device 110 for a confirmation that the device 110 is lost, and not picked up by a user. In yet another embodiment, the detection module 131 may determine that the wireless technology device 110 is lost by detecting, determining, analyzing, etc. a disconnection from a power source that occurs with a companion device, but not of the wireless technology device 110. Accordingly, embodiments of the detection module 131 may determine that a status changing event (i.e. becoming lost changes status from secure to lost) is occurring as events are occurring to or around the wireless technology device 110. The early detection of a status change helps to shorten a window of time before the owner of the wireless technology device 110 is made aware of the situation, as well as reduce a risk that a battery life drains before location and retrieval of the wireless technology device 111.

Referring still to FIG. 1, embodiments of the computing system 120 may further include a locking module 132. Embodiments of the locking module 132 may include one or more components of hardware and/or software program code for locking the wireless technology device 110 from an unauthorized pairing with another device 111, in response to detecting the status changing event. For instance, embodiments of the locking module 132 may disable a pairing function of the wireless technology device 110 to prevent a pairing of the device 110 with another device, after the detection module 131 determines that a status of the wireless technology device 110 has changed (e.g. from secure to non-secure). The locking module 132 may lock the wireless technology device 110 to prevent a non-owner from finding the wireless technology device 110 and pairing the device 110. Locking of the device 110 may also extend to locking an access or entry into the device 110 in general, in addition to a pairing function to prevent data from being retrieved from the device 110 if found by a non-owner. Furthermore, embodiments of the locking module 132 may lock the device 110 from future pairings unless a pairing request is from an original client device and/or a device with the unique lock code presented during pairing. The unique unlock code may be stored in the buffer 127, and communicated to the devices 111 as described infra. Embodiments of the locking module 132 may also record pairing attempts that were unsuccessful for establishing a device identity of a device that attempted to gain unauthorized access to the wireless technology device 110 for various security or law enforcement applications (e.g. if device is stolen from the owner).

Embodiments of the computing system 120 of the wireless technology device 110 may also include a communications module 133. Embodiments of the communications module 133 may include one or more components of hardware and/or software program code for sending an encrypted data of the wireless technology device 110 regarding the status changing event to at least one non-paired device or all nearby devices 111. Embodiments of the encrypted data may be data, lifeline data, lifeline signal data, and the like, and may contain a unique unlock code for the wireless technology device 110, a current location of the wireless technology device 110, a time that the wireless technology device 110 detected the status changing event, a nature of the status changing event, a wireless technology device owner information, a wireless technology device information, and other information pertinent and/or relevant to the status change and securely locating the wireless technology device 110.

Figure 2:
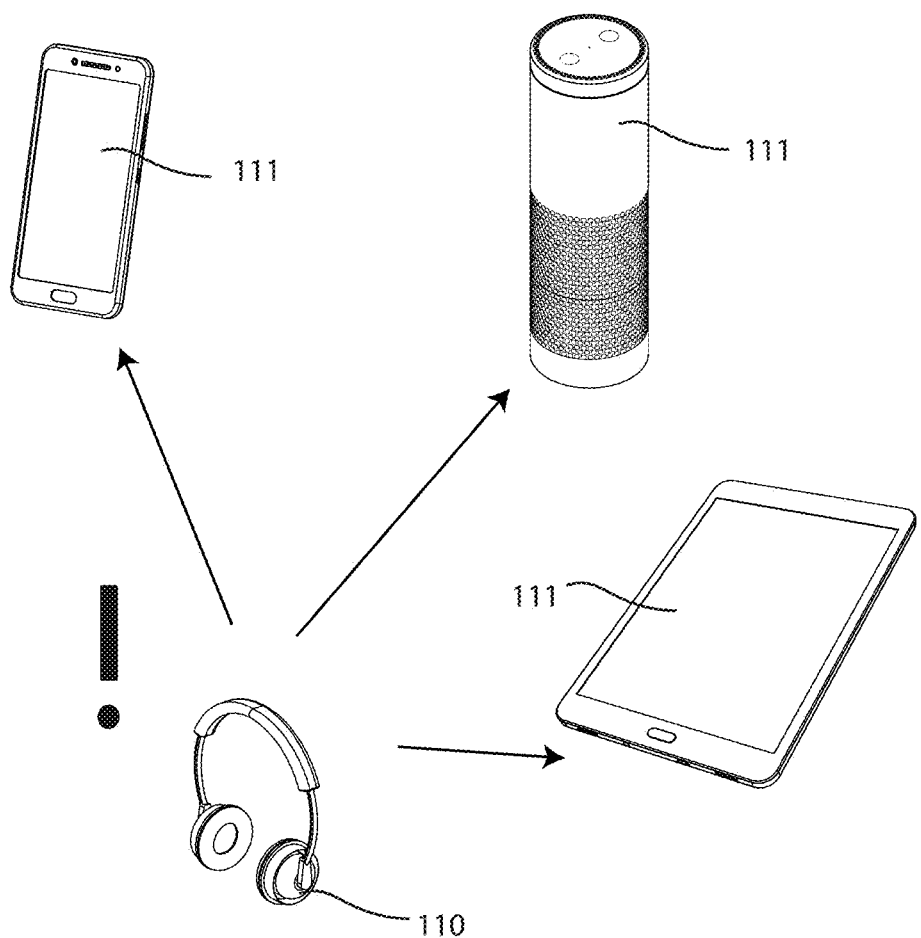
FIG. 2 depicts a schematic view of a wireless technology device communicating a lifeline signal to a plurality of devices, in accordance with embodiments of the present invention.

FIG. 2 depicts a schematic view of a wireless technology device 110 communicating a lifeline signal to a plurality of devices 111, in accordance with embodiments of the present invention. Embodiments of the communication module 133 may transmit, send, or otherwise communicate the encrypted data stored in the buffer 127 of the wireless technology device 110 to other wireless technology devices 111, immediately or sometime after the detection module 131 determines that a status has changed or in the process of changing, regardless of whether the devices 111 have ever been paired with the wireless technology device 110. For instance, embodiments of the communications module 133 may send, transmit, communicate, etc., encrypted data stored in buffer 127 to one, some, or all nearby devices 111, in response to the status change and potentially the locking of the device 110. The devices 111 receiving the lifeline signal data (e.g. encrypted data) may be device(s) currently paired with the wireless technology device 110, device(s) previously paired with the wireless technology device 110, but no longer currently paired, and device(s) that have never been paired with the wireless technology device 110. The encrypted lifeline data may be received in a buffer of each device 111 of the plurality of devices 111 receiving the lifeline signal from the wireless technology device 110. For example, the communications module 133 may inject a current location information of device 111 for transmitting to a cloud network 108. The encrypted data communicated by the communications module 133 of the computing system 120 of the wireless technology device 110 may be stored or temporarily stored in the buffer of each device 111. In an exemplary embodiment, the devices 111, or the computing systems of each device 111, may be prevented from accessing the buffer and in particular the encrypted lifeline data sent by the wireless technology device 110.

If a device 111 of the devices 111 is a wireless technology device that is currently paired with the wireless technology device 110, then the currently paired device may immediately notify the user that the a status of the wireless technology device 111 has changed. For instance, if a set of headphones currently paired with a user's smartphone determines that the set of headphones are lost, the set of headphones may send lifeline alert signals, wherein the user's smartphone receives the lifeline alert signal (e.g. encrypted data). Because the user's smartphone is currently paired with the set of headphones, the user's smart phone may immediately notify the user that the set of headphones have been lost. The user's smartphone, in this example, or wireless technology devices in general, may flash a notification on a screen of the device, may visually, audibly, haptically, etc. alert the user by beeping, vibrating, flashing, displaying, etc. The user's smartphone may simultaneously display a GPS location or other location based information to aid in the retrieval of the lost headphones. While the quick response from the currently paired device receiving and reacting to the lifeline alert from the wireless technology device 110 significantly reduces a time between the device 110 being lost and the user becoming aware of the status change, there may not always be a currently paired device capable of receiving the lifeline signal from the wireless technology device 110 when the status of the wireless technology device 110 changes.

Figure 3:
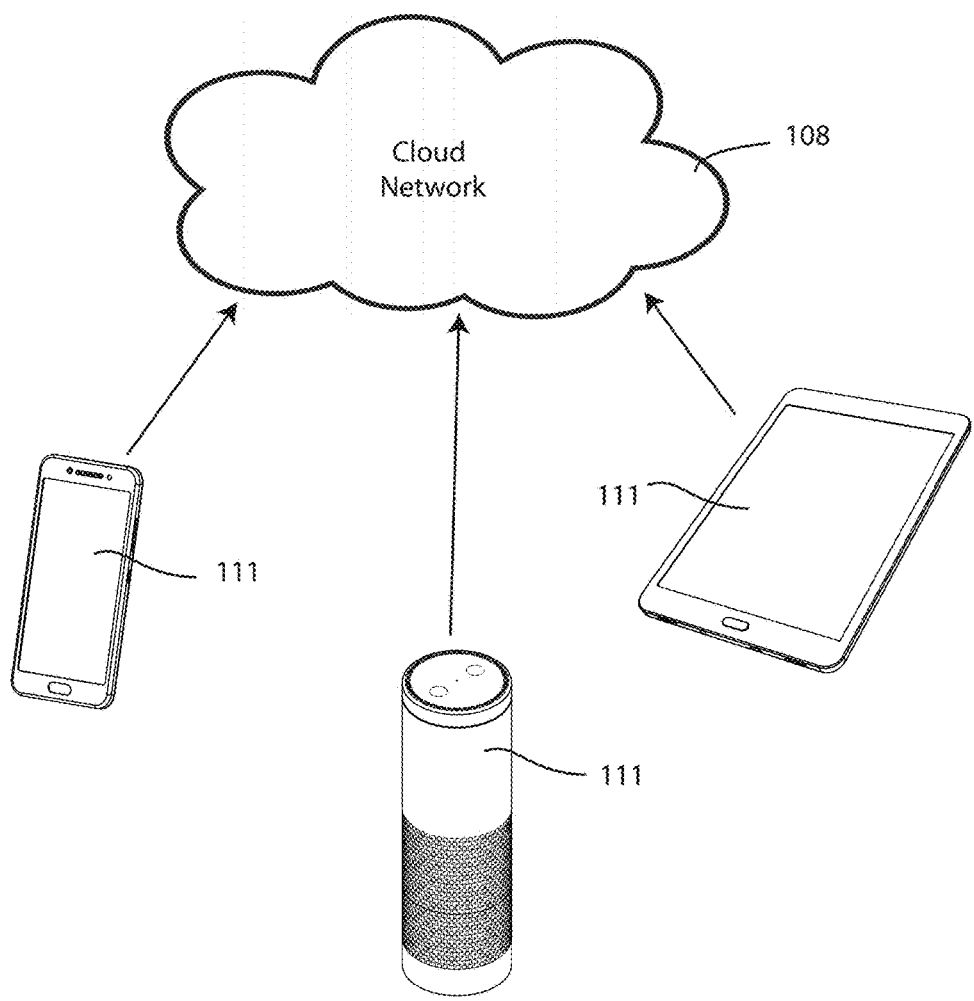
FIG. 3 depicts a schematic view of non-paired devices transmitting the encrypted data to the cloud, in accordance with embodiments of the present invention.

FIG. 3 depicts a schematic view of non-paired devices 111 transmitting the encrypted data to the cloud 108, in accordance with embodiments of the present invention. For instance, in response to receiving the encrypted data within the buffer of the device 111, non-currently paired devices 111 or never before paired devices 111 may automatically and potentially anonymously communicate the encrypted data to a centralized computing network 108 for decrypting the encrypted data and notifying the user of the status change of the wireless technology device. Embodiments of the centralized computer network 108 may be the cloud, a cloud computing network, a centralized cloud location, a lifeline cloud, and the like. In other embodiments, centralized computing network 108 may refer to a group of two or more computer systems linked together. Network 108 may be any type of computer network known by individuals skilled in the art. Examples of network 108 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 108 may be a peer-to-peer network in some embodiments, wherein in other embodiments, the network 108 may be organized as a client/server architecture.

In some embodiments, the network 108 may further comprise a connection to one or more network-accessible knowledge bases (not shown), which are network repositories containing information of the user, location information, user activity, user preferences, device information, device activity, network repositories or other systems connected to the computer network 108 that may be considered nodes of the computer network 108. In some embodiments, where the network repositories allocate resources to be used by the other nodes of the computer network 108, the network-accessible knowledge bases may be referred to as servers.

The network-accessible knowledge bases may be a data collection area on the computer network 108 which may back up and save all the data transmitted back and forth between the nodes of the computer network 108. For example, the network repository may be a data center saving and cataloging status change activity data, user data, location data, user preference data, device data/information, and the like, to generate both historical and predictive reports regarding a particular user or a user's message preference, and the like. In some embodiments, a data collection center housing the network-accessible knowledge bases may include an analytic module capable of analyzing each piece of data being stored by the network-accessible knowledge bases. In some alternative embodiments, the network-accessible knowledge bases 114 may be a local repository that is connected to the computing system 120.

Referring still to FIG. 3, embodiments of the non-paired devices 111 may transmit the encrypted data to the network 108, without sending any information associated with the devices 111. For example, if a portable Bluetooth speaker falls off of a bed and lands on the floor between the bed and the floor when the user gets out of bed (i.e. user is unaware that the speaker fell off the bed), the speaker running the lifeline application 130 may determine that the speaker is about to get lost because the speaker's sensors indicate a sharp acceleration and change in geospatial position. The portable speaker locks future pairing and send out a lifeline alert signal with the encrypted data (i.e. unlock code) to nearby devices. A tablet computer that is not paired with the portable speaker receives the encrypted data in a secure buffer of the memory or other storage medium of the tablet computer. The tablet computer may then transmit the encrypted data to a centralized server hosted in the cloud via network 108, without providing any identifying data of the tablet computer. Thus, the tablet computer anonymously transmits the encrypted data (i.e. unlock code among other content/information) to the cloud network 108, while having never been paired with the portable speaker. In this example, the tablet computer, although having never been paired with the portable speaker, may receive the life signal data because the tablet computer includes a buffer (e.g. such as buffer 127) that may be dedicated to and/or specifically designed to store lifeline data (i.e. encrypted data) of the tablet computer and to receive lifeline data from other devices, such as the portable speaker. Further, embodiments of the buffer 127 may also be formatted, coded, programmed, designed etc. to modify existing storage medium and/or memory of existing wireless technology devices 110, 111.

Figure 4:
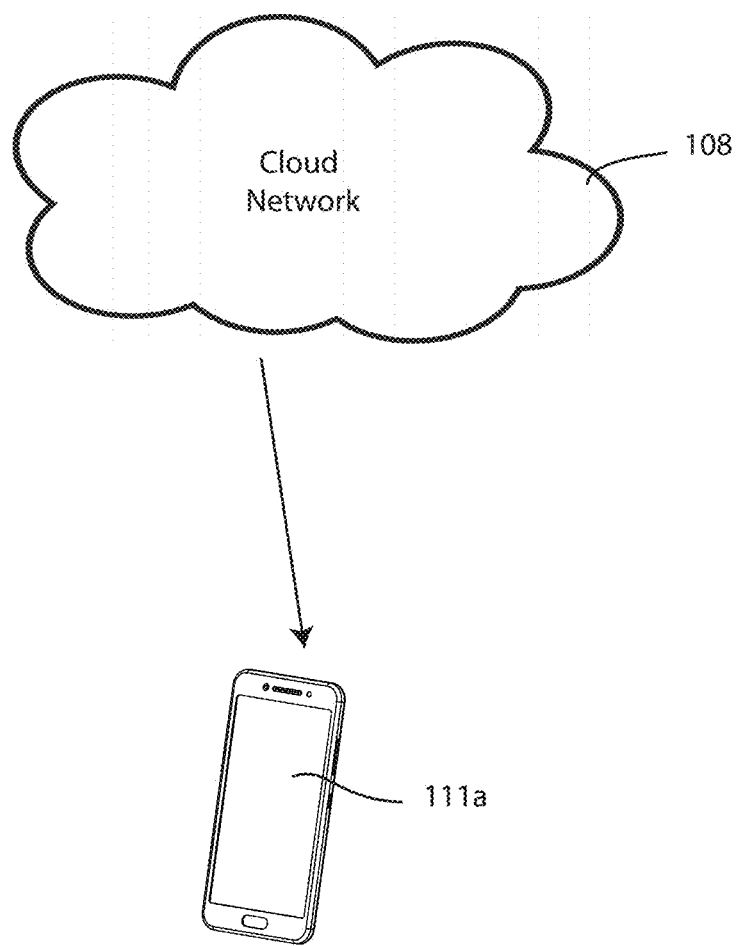
FIG. 4 depicts a schematic view of an authorized device receiving an unlock code for unlocking the wireless technology device, in accordance with embodiments of the present invention.

Moreover, embodiments of the centralized computer network 108 (e.g. the cloud) may be comprised of one more computers, servers, and the like that may process the received encrypted data to obtain a unique unlock key or unlock code to be used for unlocking the wireless technology device. For instance, the centralized computers in the network 108 may unencrypt or decrypt the encrypted data transmitted by one or more non-paired device 111, to obtain the unique unlock code/key, as well as device information, owner information, time that the device 110 status changed, data supporting one or more reasons the device 110 status changed, a number of attempted, unsuccessful pairings, last known geographic location of the device 110 when the status changed, and the like. The cloud network 108, which may also be referred to as a lifeline cloud, may notify the user that the unlock code has been obtained, or may notify the originally paired client of the wireless technology device 110. The user may be notified via a text message, an email, a push notification, and the like. In one embodiment, the information obtained by the unencryption may be stored on the cloud network 108, and may be accessible by the user using a login and password, or other access granting methods, such as biometric data techniques. Thus, the user may be notified via push notification that a device 110 has been lost, but also has been locked and the unlock code has been retrieved, as well as a last known location of the device 110. The user may then use a computing device to access the information stored on the network 108. In another embodiment, the one or more servers in the cloud network 108 may automatically notify the user that the unique code/key and other data have been obtained, and simultaneously transmit the unlock code to the user, or for example, an authorized device 111a of the user. FIG. 4 depicts a schematic view of an authorized device receiving an unlock code for unlocking the wireless technology device 110, in accordance with embodiments of the present invention. The user may designate an authorized device 111a for receiving the unlock code, or the authorized device 111a may be registered with the user's account on the network 108 for receiving the unlock code. In other embodiments, the authorized device may be the originally paired device, or a previously paired device. Embodiments of the authorized device 111a may be a smartphone, a cellphone, a computer, a tablet computer, a laptop computer, a smartwatch, or other computing device capable of receiving signal communication from cloud network 108. In embodiments where the cloud network 108 receives an RFID communication, the network 108 may map to registered RFID devices and if a match is found, the user may be notified.

In a further embodiment, the user may request or have a predetermined setting that the cloud network 108 expands the notification to a social community of other subscribers, friends, roommates, designated personnel, local authorities, etc. Thus, the cloud 108 may notify a larger community of people that a device 110 has been lost and the last known location is distributed to trusted members of the larger social community so that the trusted members or other subscribers can reach the last known location of the lost device potentially sooner than the device owner.

Figure 5:
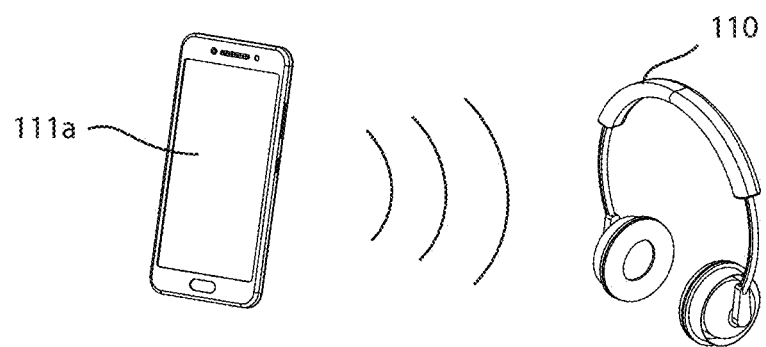
FIG. 5 depicts a schematic view of an authorized device successfully pairing with the wireless technology device, in accordance with embodiments of the present invention.

Referring back to FIG. 1, embodiments of the computing system 120 of the wireless technology device 110 may include an unlocking module 134. Embodiments of the unlocking module 134 may include one or more components of hardware and/or software program code for unlocking the wireless technology device 110 when an authorized pairing attempt is successful. FIG. 5 depicts a schematic view of an authorized device 111a successfully pairing with the wireless technology device 110, in accordance with embodiments of the present invention. For instance, the unlocking module 134 may unlock the device 110 after receiving the correct unique code/key during a pairing attempt from another device. As described supra, the centralized computer network 108 may communicate a unique unlock code to an owner of the wireless technology device 110. The unique code, which is initially stored in buffer 127, may be used to effectuate an authorized pairing attempt. If the unique code is accepted by the unlocking module 134, the unlocking module 134 may re-enable a pairing function to allow the pairing attempt to become a successful pairing, as well as allow future pairings from other devices because the status of the wireless technology device 110 has returned to a safe or secure status. Various unlocking techniques may be used to enable a pairing of the device 110, provided the requesting device can communicate the correct unique code for the device 110.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the secure status communication system 100 may improve computer/device technology by offering a method to increase the number of devices receiving encrypted data containing at least a unique code/key, which must be unencrypted, by altering the computing device itself. For instance, a memory structure or data storage structure of the computing system 120 of the wireless technology device must be altered and/or improved to include a buffer 127 that is designed to contain encrypted data but also receive encrypted data pertaining to other devices, which may not be accessed by the rest of the computing system 120, except to send/transmit anonymously to a centralized computer location 108. Thus, the secure status communication system 100 may be necessarily rooted in computer technology because the computing devices are being modified to accomplish the storing and sending of encrypted data from wireless technology devices that have never been paired with a wireless technology device that may be lost or stolen.

Furthermore, the secure status communication system 100 improves computer technology by saving computing power resources. Forcing small, computing device with limited processing power and smaller batteries to begin beeping, flashing, emitting signals, etc. to be found can be demanding on the computing power resources and battery life of the device. If the device is not found immediately, battery life can be wasted by beeping, flashing, attempting to connect to the internet, etc. The claimed solution is necessarily rooted in computer technology in order to overcome a problem specifically arising in the realm of computer technology. By broadcasting a lifeline signal to a plurality of other devices 111, computer resources and power consumption is passed on to the other devices where battery life is not critical because those devices do not need to be found.

Figure 6:
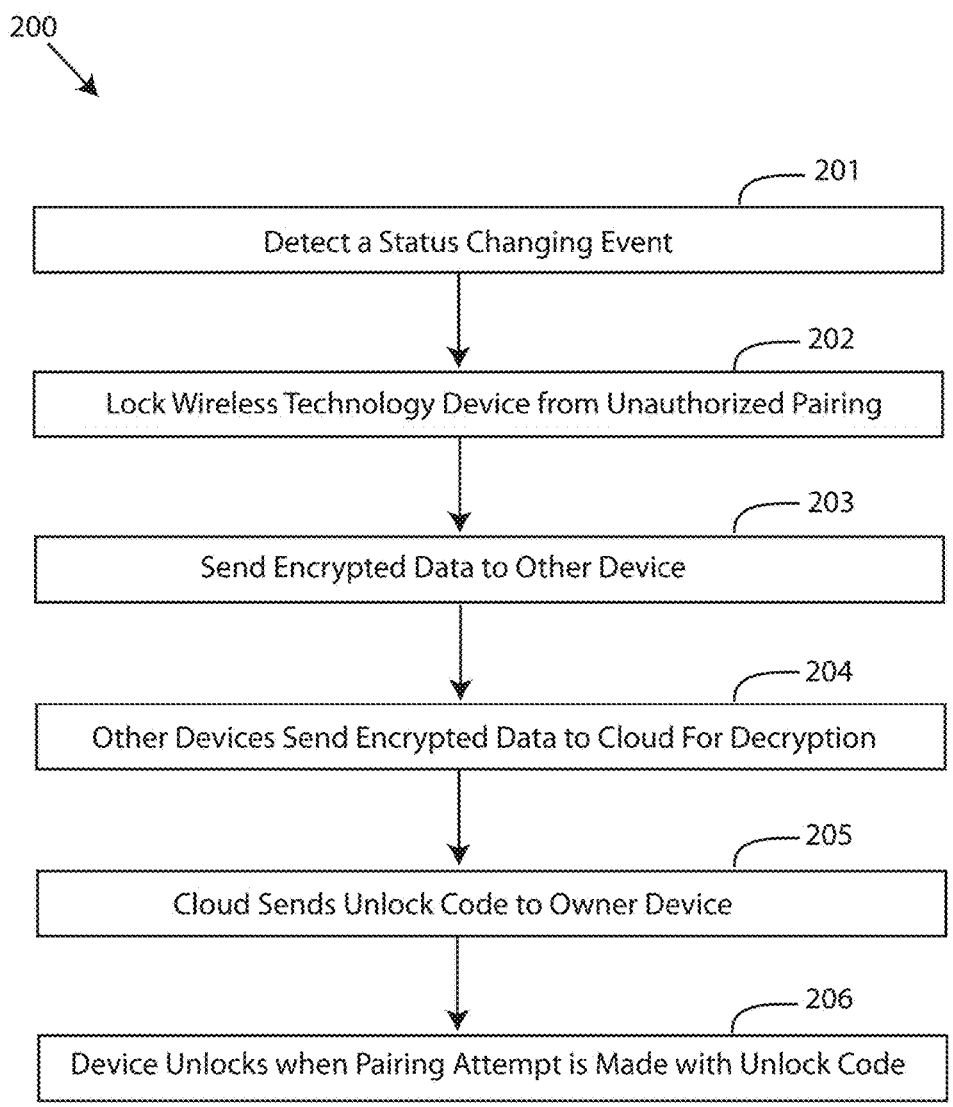
FIG. 6 depicts a flow chart of a method for securely communicating a status of a wireless technology device to a non-paired device, in accordance with embodiments of the present invention.

Referring now to FIG. 6, which depicts a flow chart of a method 200 for securely communicating a status of a wireless technology device to a non-paired device, in accordance with embodiments of the present invention. One embodiment of a method 200 or algorithm that may be implemented for securely communicating a status of a wireless technology device to a non-paired device with the secure status communication system 100 described in FIGS. 1-5 using one or more computer systems as defined generically in FIG. 8 below, and more specifically by the specific embodiments of FIG. 1.

Embodiments of the method 200 for securely communicating a status of a wireless technology device to a non-paired device, in accordance with embodiments of the present invention, may begin at step 201 wherein a status changing event is detected. A status changing event may be a determination that the wireless technology device 110 is lost, about to get lost, is getting lost, is stolen, and the like. Step 202 locks the wireless technology device 110 from unauthorized future pairing for maintaining a level of data security associated with the device 110, as well as prevent non-owners of the device 110 to use the device 110 without proper authorization. Step 203 sends encrypted data to other devices 111. The encrypted data may include a unique code stored in a buffer 127 of the wireless technology device 110. The other devices 111, which may be other wireless technology devices, may receive the encrypted data in a buffer of the devices 111. In step 204, the other devices 111 send the received encrypted data to the cloud, such as network 108, for decryption of the data to obtain an unlock code of the device 110. The other devices 111 may also inject a current location information and send the encrypted data to the cloud for decryption. In step 205, the cloud sends the unlock code to an authorized device 111a. Alternatively, the user is notified that the code is available, and the user accesses the cloud database to retrieve the unlock code. Step 206 unlocks the device when a pairing attempt is made with the unlock code.

Figure 7:
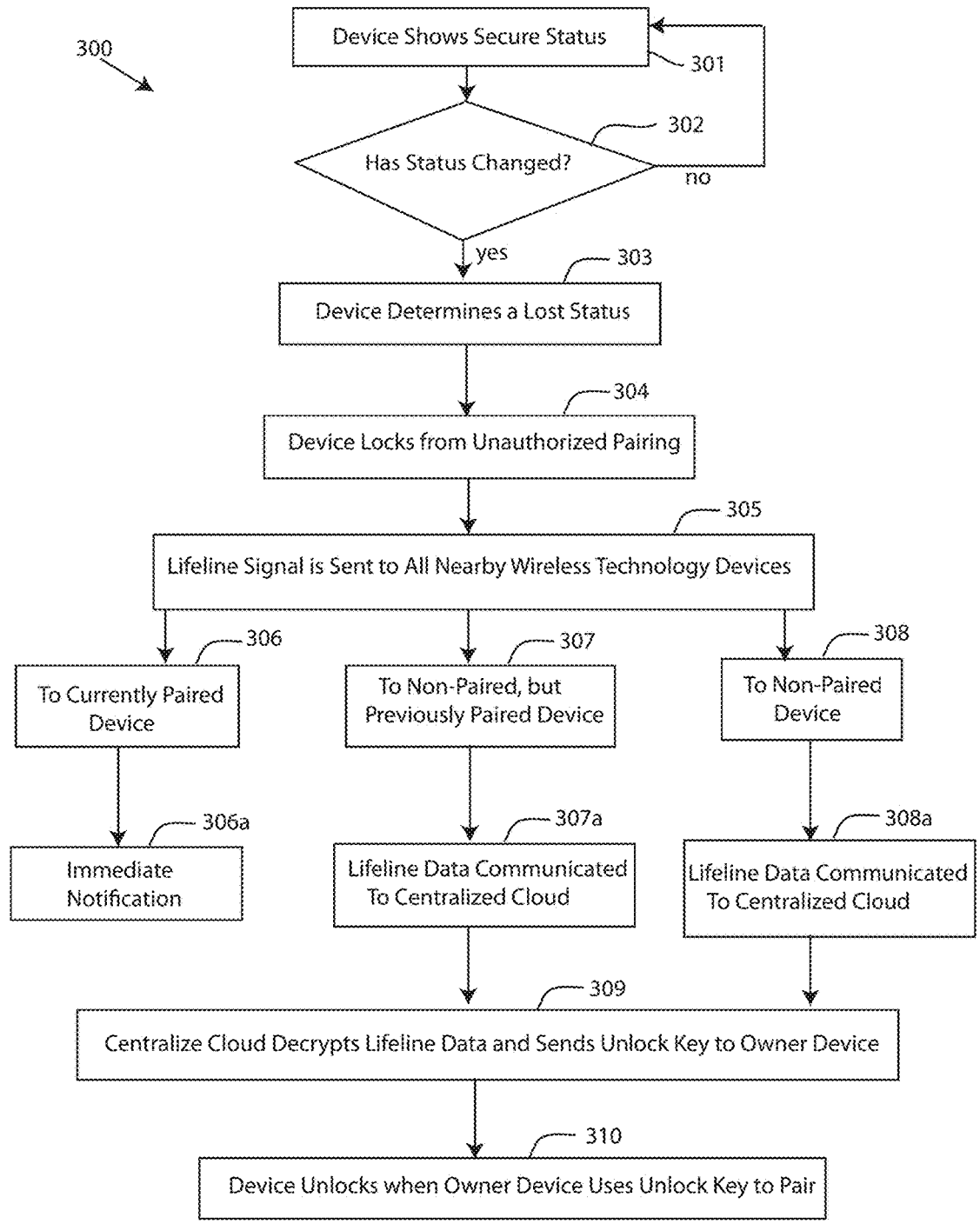
FIG. 7 depicts a detailed flow chart of a method for securely communicating a status of a wireless technology device to a non-paired device, in accordance with embodiments of the present invention.

FIG. 7 depicts a detailed flow chart of a method 300 for securely communicating a status of a wireless technology device to a non-paired device, in accordance with embodiments of the present invention. Embodiments of the method 300 for securely communicating a status of a wireless technology device to a non-paired device may begin at step 301, wherein the wireless technology device shows a secure status. Step 302 determines whether the status of the wireless technology device has changed. If no, then the device status remains secure (i.e. not lost). If yes, step 303 determines that the status of the wireless technology device has changed to a lost or non-secure status. Step 304 locks the device in response to the status change from secure to non-secure. At step 305, the wireless technology device sends out lifeline signals containing encrypted data, which include an unlock code, to all nearby devices, clients, etc., over a network, such as network 107. At step 306, the lifeline signal is received by a currently paired device, and thus step 306a immediately notifies the user (e.g. visually, audibly, haptically). At step 307, the lifeline signal is received by a non-paired device, but previously paired device. Step 307a communicates the lifeline data to a centralized cloud location. The lifeline buffer of the other device may communicate encrypted data and current location to the centralized cloud location 108. The lifeline buffer 127 can pull in current location from the other device that communicates to centralized cloud 108. At step 308, the lifeline signal is received by a non-paired device, which has never been paired with the wireless technology device. Step 308a communicates the lifeline data to a centralized cloud location. At step 309, the centralized cloud location decrypts the lifeline data and sends or otherwise makes available the unlock key and potentially a location to the owner of the wireless technology device. Step 310 unlocks the device using the unlock code.

Figure 8:
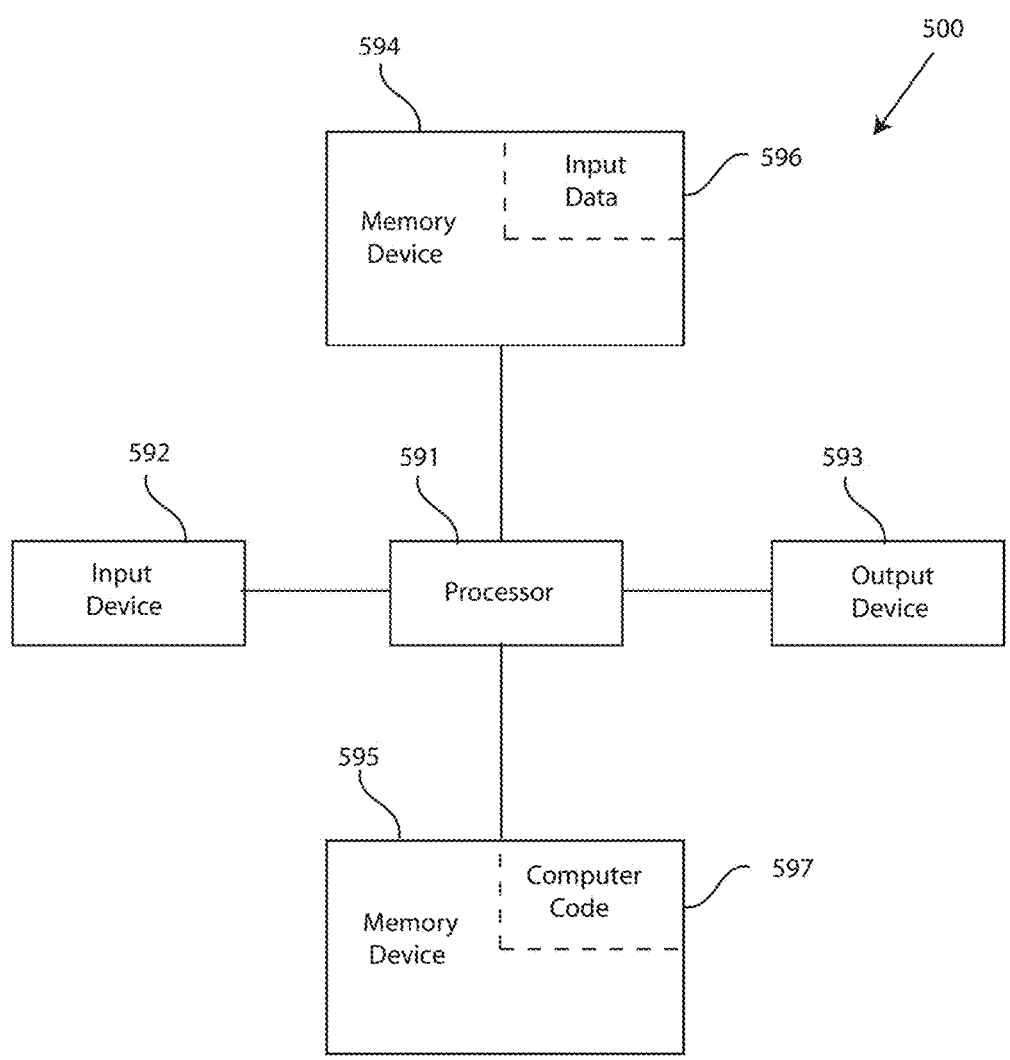
FIG. 8 depicts a block diagram of a computer system for the secure status communication system of FIGS. 1-5, capable of implementing methods for securely communicating a status of a wireless technology device to a non-paired device of FIGS. 6-7, in accordance with embodiments of the present invention.

FIG. 8 depicts a block diagram of a computer system for the secure status communication system 100 of FIGS. 1-5, capable of implementing methods for securely communicating a status of a wireless technology device to a non-paired device of FIGS. 6-7, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for securely communicating a status of a wireless technology device to a non-paired device in the manner prescribed by the embodiments of FIGS. 6-7 using the secure status communication system 100 of FIGS. 1-5, wherein the instructions of the computer code 597 may be executed by processor 591 via memory device 595. The computer code 597 may include software or program instructions that may implement one or more algorithms for implementing the method for securely communicating a status of a wireless technology device to a non-paired device, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 8.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to secure status communication systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to determine a status change and send out a lifeline signal data to other devices for obtaining a code to use for unlocking the lost device. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for securely communicating a status of a wireless technology device to a non-paired device. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for securely communicating a status of a wireless technology device to a non-paired device.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
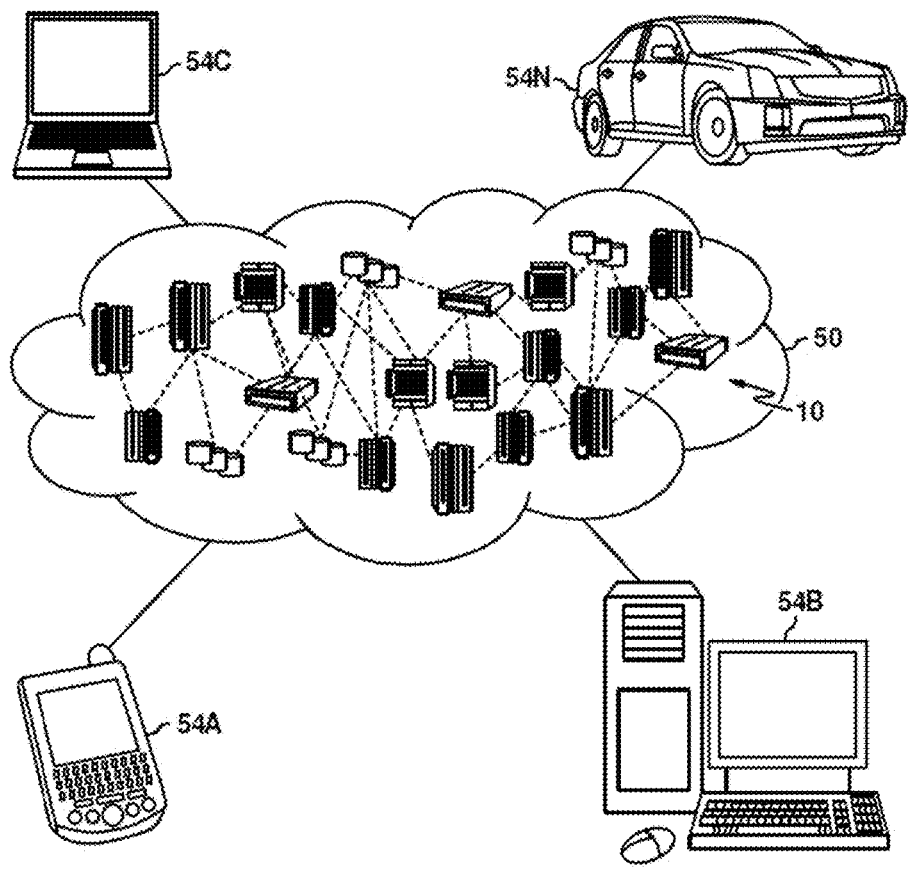
FIG. 9 depicts a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 10:
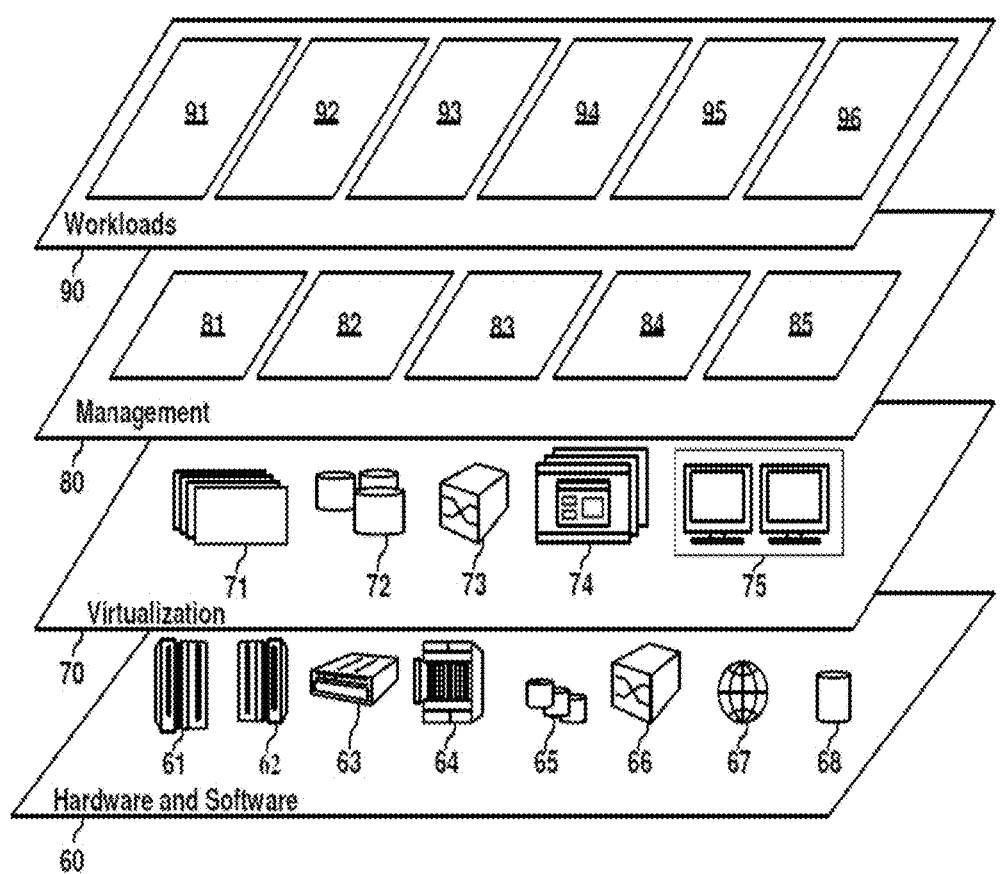
FIG. 10 depicts abstraction model layers, in accordance with embodiments of the present invention.

Referring now to FIG. 10, a set of functional abstraction layers provided by cloud computing environment 50 (see FIG. 9) are shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure status communication among devices 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for securely communicating a status of a wireless technology device to a non-paired device, the method comprising:
   detecting, by a processor of the wireless technology device, a status changing event of the wireless technology device;
   locking, by the processor, the wireless technology device from an unauthorized pairing with another device, in response to detecting the status changing event;
   sending, by the processor, an encrypted data regarding the status changing event to at least one non-paired device, which is received in a buffer of the at least one non-paired device, wherein, in response to receiving the encrypted data, the at least one non-paired device automatically communicates the encrypted data to a centralized computing network for decrypting the encrypted data; and
   unlocking, by the processor, the wireless technology device when an authorized pairing attempt is successful.

2. The method of claim 1, wherein the status changing event includes determining that the device is lost.

3. The method of claim 2, wherein determining that the device is lost includes at least one of: a proximity range between the device and a companion device is exceeded, a sensor of the device determines that the device is falling, and a disconnection from a power source occurs with the companion device, but not the device.

4. The method of claim 1, wherein the encrypted data includes a unique unlock code for the wireless technology device, a current location of the wireless technology device, a time that the wireless technology device detected the status changing event, a nature of the status changing event, a wireless technology device owner information, and a wireless technology device information.

5. The method of claim 1, wherein the centralized computer network communicates a unique unlock code to an owner of the wireless technology device for making the authorized pairing attempt, after receiving and decrypting the encrypted data from the non-paired device.

6. The method of claim 1, wherein the buffer of the non-paired device is inaccessible by an operating system of the non-paired device, so that the non-paired device does not have access to the encrypted data when received, and a unique unlock code associated with the wireless technology device is stored in a buffer of the wireless technology device, inaccessible by an operating system of the wireless technology device, and communicated to the non-paired device along with the encrypted data.

7. The method of claim 1, further comprising: transmitting, by the processor, the encrypted data to a currently paired device in response to detecting the status changing event, wherein the currently paired device notifies an owner of the device.

8. A wireless technology device, comprising:
   a processor;
   a memory device coupled to the processor;
   a buffer storing a unique unlock code associated with the wireless technology device; and
   a computer readable storage device coupled to the processor, wherein the storage device contains program code executable by the processor via the memory device to implement a method for securely communicating a status of a wireless technology device to a non-paired device, the method comprising:
      detecting, by the process, a status changing event of the wireless technology device;
      locking, by the processor, the wireless technology device from an unauthorized pairing with another device, in response to detecting the status changing event;
      sending, by the processor, an encrypted data regarding the status changing event to at least one non-paired device, which is received in a buffer of the at least one non-paired device, wherein, in response to receiving the encrypted data, the at least one non-paired device automatically communicates the encrypted data to a centralized computing network for decrypting the encrypted data; and
      unlocking, by the processor, the wireless technology device when an authorized pairing attempt is successful.

9. The wireless technology device of claim 8, wherein the status changing event includes determining that the device is lost.

10. The wireless technology device of claim 9, wherein determining that the device is lost includes at least one of: a proximity range between the device and a companion device is exceeded, a sensor of the device determines that the device is falling, and a disconnection from a power source occurs with the companion device, but not the device.

11. The wireless technology device of claim 8, wherein the encrypted data includes a unique unlock code for the wireless technology device, a current location of the wireless technology device, a time that the wireless technology device detected the status changing event, a nature of the status changing event, a wireless technology device owner information, and a wireless technology device information.

12. The wireless technology device of claim 8, wherein the centralized computer network communicates a unique unlock code to an owner of the wireless technology device for making the authorized pairing attempt, after receiving and decrypting the encrypted data from the non-paired device.

13. The wireless technology device of claim 8, wherein the buffer of the non-paired device is inaccessible by an operating system of the non-paired device, so that the non-paired device does not have access to the encrypted data when received, and a unique unlock code associated with the wireless technology device is stored in a buffer of the wireless technology device, inaccessible by an operating system of the wireless technology device, and communicated to the non-paired device along with the encrypted data.

14. The wireless technology device of claim 8, further comprising: transmitting, by the processor, the encrypted data to a currently paired device in response to detecting the status changing event, wherein the currently paired device notifies an owner of the device.

15. A computer program product, comprising a computer readable hardware storage device storing a computer readable program code, the computer readable program code comprising an algorithm that when executed by a computer processor of a computing system implements a method for securely communicating a status of a wireless technology device to a non-paired device, the method comprising:
- detecting, by a processor of the wireless technology device, a status changing event of the wireless technology device;
- locking, by the processor, the wireless technology device from an unauthorized pairing with another device, in response to detecting the status changing event;
- sending, by the processor, an encrypted data regarding the status changing event to at least one non-paired device, which is received in a buffer of the at least one non-paired device, wherein, in response to receiving the encrypted data, the at least one non-paired device automatically communicates the encrypted data to a centralized computing network for decrypting the encrypted data; and
- unlocking, by the processor, the wireless technology device when an authorized pairing attempt is successful.

16. The computer program product of claim 15, wherein the status changing event includes determining that the device is lost.

17. The computer program product of claim 16, wherein determining that the device is lost includes at least one of: a proximity range between the device and a companion device is exceeded, a sensor of the device determines that the device is falling, and a disconnection from a power source occurs with the companion device, but not the device.

18. The computer program product of claim 15, wherein the encrypted data includes a unique unlock code for the wireless technology device, a current location of the wireless technology device, a time that the wireless technology device detected the status changing event, a nature of the status changing event, a wireless technology device owner information, and a wireless technology device information.

19. The computer program product of claim 15, wherein the centralized computer network communicates a unique unlock code to an owner of the wireless technology device for making the authorized pairing attempt, after receiving and decrypting the encrypted data from the non-paired device.

20. The computer program product of claim 15, wherein the buffer of the non-paired device is inaccessible by an operating system of the non-paired device, so that the non-paired device does not have access to the encrypted data when received, and a unique unlock code associated with the wireless technology device is stored in a buffer of the wireless technology device, inaccessible by an operating system of the wireless technology device, and communicated to the non-paired device along with the encrypted data.

* * * * *